STAGE I

Fig. 4.

STAGE II

H. O. SMERD ET AL 3,442,075

WELDING MACHINES

Filed Feb. 5, 1964

STAGE III

Inventors:
Hans Otto Smerd
and
Peter Joseph Bonner
By Baldwin & Wight
Attorneys

United States Patent Office 3,442,075
Patented May 6, 1969

3,442,075
WELDING MACHINES
Hans Otto Smerd and Peter Joseph Bonner, Stourport-on-Severn, England, assignors to Parsons Chain Co. Limited, Stourport-on-Severn, England, a corporation of the United Kingdom
Filed Feb. 5, 1964, Ser. No. 342,685
Claims priority, application Great Britain, Dec. 13, 1963, 49,443/63
Int. Cl. B21l 15/00
U.S. Cl. 59—29        15 Claims This invention relates to chain welding machines and is more particularly concerned with a device for trimming off the flash or burr which remains on the chain link following the welding operation.

Numerous attempts have been made to design a trimming device for the flash or burr of metal which is produced on the link following the welding operation at the point where the abutting ends are united by the weld. In practice, this trimming operation on the chain link is carried out immediately following the weld and while the link remains gripped in the jaws which are arranged on both sides of the weld by electrodes so that the chain link is held at each end.

It will be appreciated, however, that the main difficulty in designing the trimming device is due to the confined space in which this has to operate. Where the tool has to operate by advancing from one side of the link, it is necessary for the grip or clamp on that side to retreat and also for the electrodes to be withdrawn in order to allow the trimming head to have access to the flash or burr.

According to the present invention a method of removing the flash or burr from the joint between the ends of a welded chain link, or the joint between two components of circular cross-section, comprises the steps of moving a cutter tool, said tool consisting of two spaced cutting elements, one of which has a leading cutting edge and a trailing cutting edge and the other of which has a single cutting edge, in a direction which is transverse to the longitudinal axle of the joined ends of the link or components into cutting engagement with the flash so that said leading cutting edge removes a part of said flash and said single cutting edge penetrates another diametrically opposite part of said flash, rotating said cutter tool through at least 180° so that said trailing cutting edge and said single cutting edge act in unison to remove the remainder of said flash, rotating said cutter tool to return it to its initial cutting position, and finally moving said cutter tool away from said joined ends.

A device for removing the flash or burr from the joint between the ends of a welded chain link, or the joint between two components of circular cross-section according to this invention, comprises a rotatably mounted cutter tool adapted to be moved, in a direction which is transverse to the longitudinal axis of the joined ends of the link or components, into cutting engagement with the flash, in which the cutter tool consists of two spaced cutting elements, one of which has a loading cutting edge and a trailing cutting edge, and the other of which has a single cutting edge, the said cutting edges being arranged in parallel relationship one with the other and, in use, with the longitudinal axis of the joined ends of the link or components being worked.

According to the present invention also a cutting device for removing the flash or burr from a welded chain link comprises a support or cutter arm capable of movement to and from cutting position, said movement being in a plane which is transverse to the link:

a trimming head carried by the support arm and mounted for rotary movement therein;

the trimming head having cutting means spaced apart to perform separate cuts on the flash of the link from opposite sides thereof;

the arrangement being such that on movement of the support arm to its cutting position, each cutting means will engage the flash of the link to effect an initial cut therein by a linear or substantially linear motion, a further or second cut being effected by a circular motion of said cutting means on rotation of the trimming head;

and means on the arm operatively associated therewith for imparting rotation to the trimming head.

The invention is diagrammatically illustrated in the accompanying drawings in which:

FIGURE 7 showing the mechanism when the support arm has been moved forward and the flash partly stripped from the link, while FIGURE 8 shows a subsequent stage after the trimming head has been partly rotated to remove the remainder of the flash;

FIGURE 9 is an elevation and FIGURE 10 a transverse section on the line 10—10 of FIGURE 9 showing the part of the support with the modified mechanism of FIGURES 7 and 8 attached thereto:

FIGURE 11 is a side elevation and FIGURE 12 a transverse section on an enlarged scale on the lines 12—12 of FIGURE 11 showing a swinging support arm fitted with the modified mechanism of FIGURES 7 and 8.

Referring first to the drawings, the chain indicated at C is shown with a link in position adjacent the welding head, the electrodes thereof, which are arranged in pairs with an electrode in each pair on opposite sides of the metal of the link, being indicated respectively at E, E'.

During the welding operation the link is held stationary by means of conventional jaws, J of the machine M.

Figure 1:
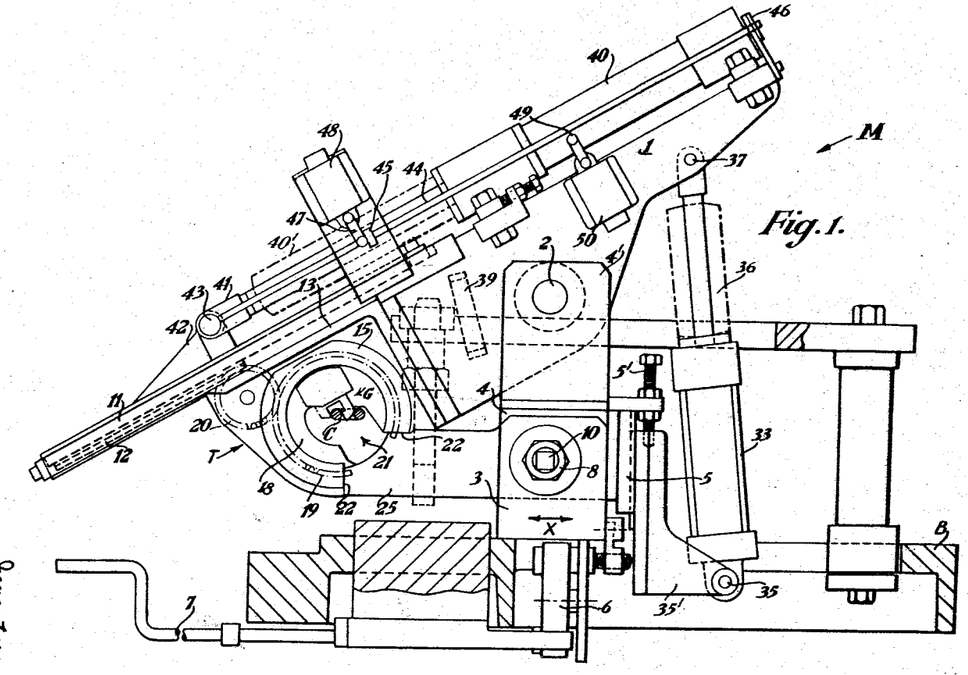
FIGURE 1 is a side elevation showing the trimming head and the support arm therefor, the welding support and grips being omitted.
Figure 2:
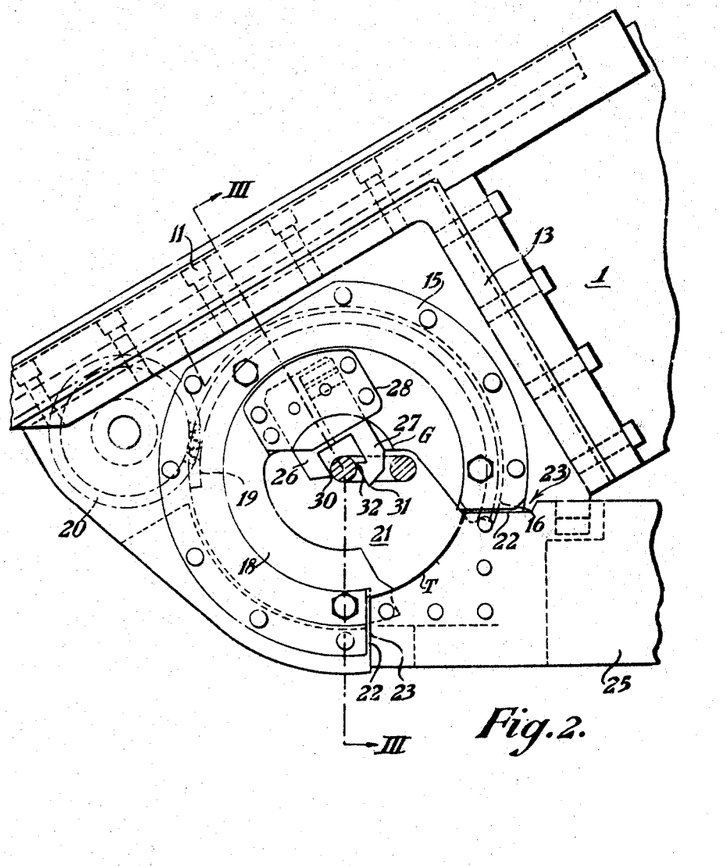
FIGURE 2 is an elevation on an enlarged scale corresponding to part of FIGURE 1 and including the gripping heads.
Figure 3:
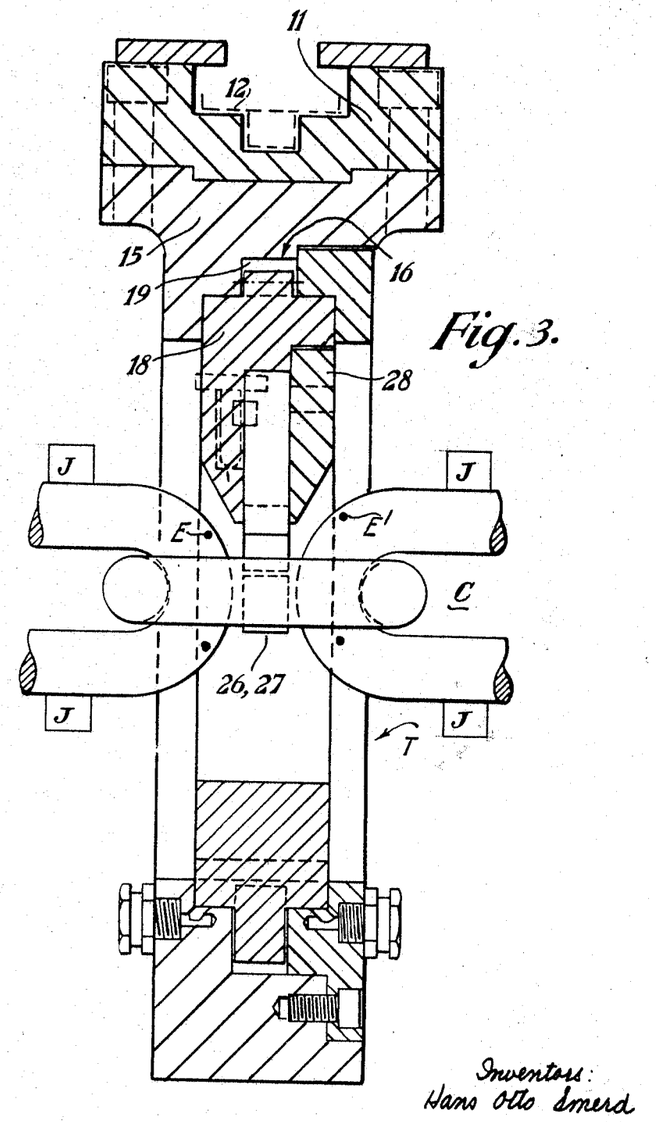
FIGURE 3 is a transverse section on the line III—III of FIGURE 2.

Referring to FIGURES 1–3, the trimming device of this invention makes use of a pivot support or cutter arm 1 mounted for angular displacement about a horizontal pivot provided by a spindle 2, so arranged that the pivoting axis is parallel to the longitudinal axis of the link C.

Slidably mounted on a base plate B is a traversing block 3 which in turn carries a bracket 4. Bracket 4 includes two spaced upright arms 4' in which is fixed the spindle 2 about which the cutter arm 1 pivots. Provision is made for the adjustment of the bracket 4 in a vertical and horizontal direction so that the position of the trimming head, in relation to the operative cutting position can be adjusted.

For this purpose the traversing block 3 is capable of limited movement in the direction of the arrow X, i.e. in a horizontal plane transverse to the longitudinal axis of the link, such adjustment being affected by means of a screw-operated mechanism, indicated generally at 6, operated by a crank handle 7 accessible from the front of the machine M so that the block 3, together with the spindle 2, can be moved in a horizontad direction towards or away from the welding position.

Mounted in the block 3 is a pin 8 having an eccentric (not shown), for co-operation with a bush engaging a bore in bracket 3. Pin 8 has a squared head 10 so that, on turning the pin, it is possible to raise and lower the bracket 4 mounting the pivot 2 for the arm 1, thus providing for micrometer adjustment in a vertical direction.

Extending lengthwise of the swinging arm 1 is a slide 11 for a rack bar 12, by which drive is imparted to a trimming head indicated generally at T rotatably mounted in a circular cut-out formed in an inverted L-shaped bracket 13 fixed to the underside of the support arm 1 so that the trimming head in which the cutting tool is mounted can be partially rotated about a fixed center on the support arm 1, as will appear more fully hereafter.

The bracket 13 (FIGURES 1–3) carries plate 15 in which is a circular cut out formed with bearing surface 16 for an annular tool holder 18 on the perimeter of which are teeth 19 arranged in the arc of a circle and extending over an angle slightly greater than 180°.

Meshing with the teeth 19 is a pinion 20 which is in driving engagement with teeth on the rack bar 12.

The trimming head T is cut away as indicated at 21 to provide an opening giving access to the centre of the trimming tool holder, the two end surfaces, indicated respectively at 22, being set at an angle of 90° to one another for co-operation with abutmnet surfaces 23 (FIGURE 2) provided on wear plates 25 attached to opposite sides of the traversing block 4. The abutment surfaces 23 serve as stops to limit movement of the support arm and thus to locate it in the operative and cutting position in which position the fixed center about which the trimming head is rotatable coincides with the longitudinal axis of the link.

Removal of the flash or burr is performed by cutting edges provided on lower and upper tool bars 26, 27, these tool bars being releasably held in the tool holder by means of a detachable cover plate 28.

The lower tool bar 26 has a single leading cutting edge 30 whereas the upper tool bar 27 has two cutting edges 31, 32, the edge 31 being a leading cutting edge and the edge 32 being a trailing cutting edge.

It will be seen that the cutting edge 30 and the two corresponding edges on the upper bar 27 are formed on surfaces extending in parallel planes to one another and at a distance apart to accommodate the thickness of the metal from which the link is made.

Figure 4:
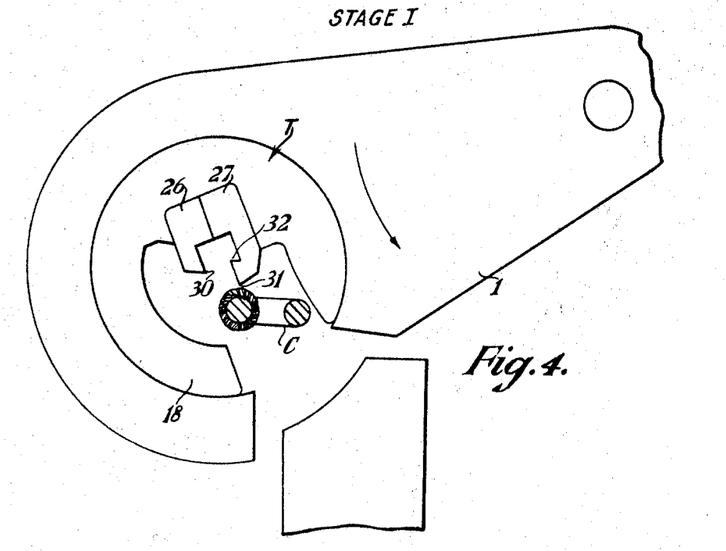
FIGURES 4, 5 and 6 are diagrammatic views of the trimming head showing successive stages in the trimming operation.
Figure 5:
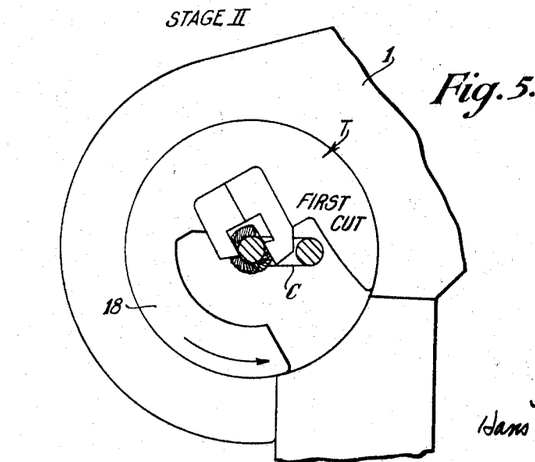
Figure 6:
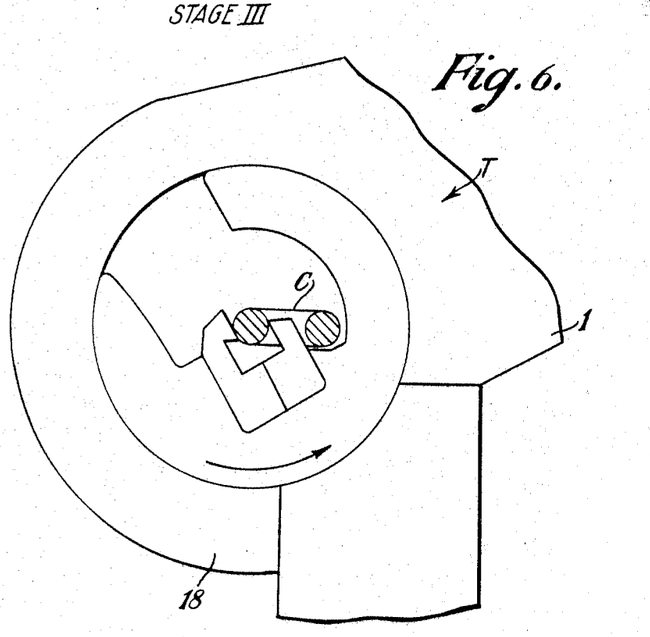

Referring now to FIGURES 4–6, the support arm 1 carrying the tool holder 18 is moved towards the chain link C (Stage I), the first cut (Stage II) is made as the support arm completes its pivotal (descending) movement, at which moment the leading cuting edge 31 of the upper tool 27 has advanced across the flash (see FIGURE 5).

The initial cut is made by the leading edge 31 which moves in a plane tangential to the perimeter of the link, the movement of the tool 27 being sufficient to advance the trailing edge 32 to a point where the diameter intersects the tangent at the point of contact, and in which the center of rotation of the trimming head and its tool coincide with the link axis.

The lower tool 26 at this time will have advanced to a point where its cutting edge 30 is in a corresponding position and diametrically opposite the cutting edge 32. Both tools are now positioned to complete Stage III of the cut, which is performed by a rotary motion of the trimming head.

On completion of Stage II, at which time the stop surfaces 22 will have engaged the wear plates 25, provision is made by means (not shown) to lock the arm 1 against displacement, following which, movement is transmitted to the rack bar 12, which in turn will cause partial rotation of the tool holder 18 in the anticlockwise direction, Stage III (FIGURE 6). During Stage II, as stated above, the cutting edges 30, 31 respectively on the tool bars 26, 27 come into operation. It will be appreciated that throughout their entire rotary movement, the thrust due to the outing action of each of the tool bars 26, 27 counterbalance one another.

Since the angular (rotation) displacement of the tool holder is through an angle in excess of 180° this will completely shear off the flash.

At completion of Stage III (FIGURE 6), the direction of rotation of tool holder 18 is reversed when the tool bars will again take up the position at the commencement of Stage II shown in FIGURE 5 after which the tool holder will be withdrawn.

Control of the support arm 1 is by means of a double-acting ram, whose cylinder 33 is pivotally anchored at 35 to a bracket 35' mounted on the bracket arm 4' by means of a vertical slide 5, its position being adjustable by means of a set screw 5'. The ram piston rod 36 is pivotally connected at 37 to the rear end of support arm 1.

It will be seen that on admitting fluid pressure to ram 33, 36, the forward end of the support arm 1 is depressed, thus causing the trimming head T and its tool holder 18 to move into position where both tools 26, 27 have made their initial cut, as shown in FIGURE 5. On completion of this movement, the support arm is arrested by contact of surfaces 22 with the stop plates 25. Locking of the pivot arm 1 in its operative position is conveniently effected by a valve (not shown) in the hydraulic system of ram 33, 36. To actuate the locking valve a striker 39 is placed in the downward path of the arm 1 and so arranged that on engagement with the arm 1 with the striker a signal is transmitted to a solenoid which controls the valve.

A second double-acting ram 40 having a piston rod 40' is mounted on the support arm 1 to impart forward and reverse movements to the rack bar 12. The piston rod 40' of the ram 40 is connected to a clevis 41 carried by reinforcing bracket 42 on the rack arm 12. Connected to a pin 43 on the clevis is a limit switch knocking rod 44 which is slidable in a bracket 46 and is fitted with a collar 45. The collar 45 co-operates with a lever 47 of a stop switch 48 and with a similar lever 49 of a reversing switch 50.

On emission of a signal from the striker 39, which occurs on completion of the operative stroke of the support arm 1, this signal, in addition to operating the valve for locking the arm 1, is used to initiate a current for operating a valve through which hydraulic pressure is admitted to the ram 40 when the rack arm will be moved and in so doing impart motion through pinion 20 to the tool holder 18.

On completion of the movement of the ram 40 (end of Stage II), the collar 45, on knocking rod 44, which moves with the rack, will strike the reversing switch trip lever 49 so that the direction of movement of the ram 40 will be reversed, in order to extend the ram and bring about the return (clockwise) rotation of the tool holder (Stage III). Thereafter, engagement between the collar 45 and the lever 47 of the stop switch 48 will put the ram 40 out of operation until it is required for the next link.

The arrangement of the two cutting tools 26, 27 has the advantage that they cut simutlaneously and insofar as the rotary movement of the tool holder T is concerned, they counterbalance each other.

In the event of its being necessary to trim a different size of chain, it is a simple matter to change the two cutters and also to introduce a different gears so as to suit the geometry of the chain.

Figure 7:
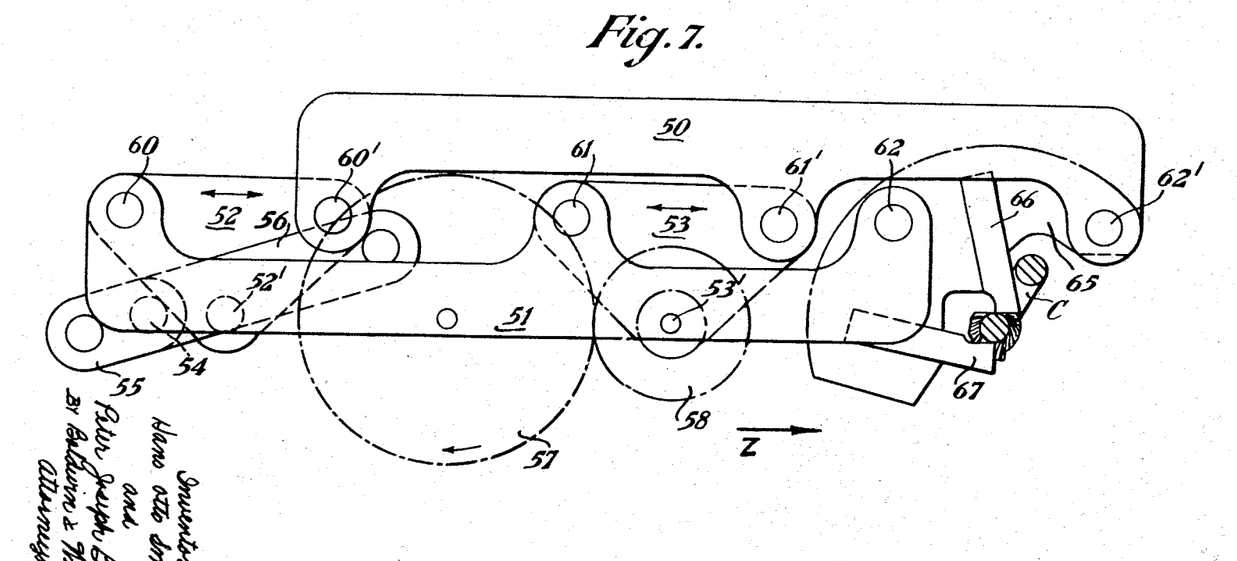
FIGURES 7–8 are a side elevation of an alternative form of mechanism for operating the trimming head.
Figure 8:
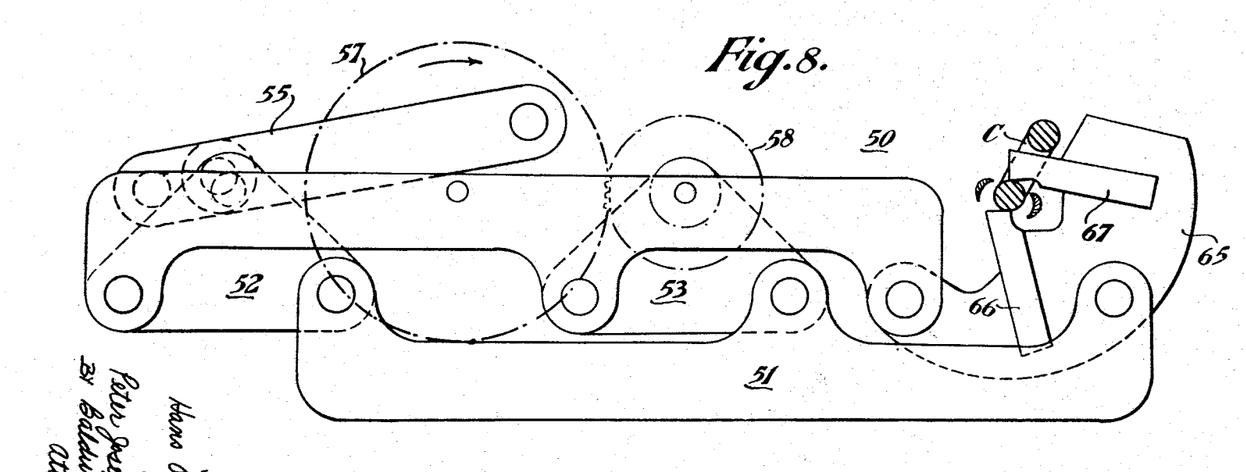

Referring now to FIGURES 7–8 there is shown an alternative means for effecting angular displacement of the trimming head. In this embodiment the means for imparting rotary movement to the trimming head which carries the cutting tools comprises two links 50, 51, associated with a support arm (not shown).

Each of the links 50, 51 is in the form of an elongated plate, the two plates being coupled to one another by two-armed lever members which, for convenience, are constructed in the form of a triangle, one being indicated at 52 and the other at 53. The lever members 52, 53 are fast on fulcrum pins 52', 53' respectively, suitably spaced on, and fixed to, the main support.

A driven spindle 54, also mounted on the support arm is driven in timed relation to the forward and reverse movement of the arm to and from its operative position so that it makes one complete motion of each traversing movement of the support arm, this motion being a rotary one through an angle greater than 180°.

Fast on the drive spindle 54 is a crank 55 coupled through a connecting link 56 to an eccentric pin fast on a large pinion 57 mounted to rotate about a centre on the support arm and driving a smaller pinion 58, which pinion in fast on the stud 53' mounting the lever 53.

Each of the link plates 50, 51 has three pairs of pivoting centres or fucrum points 60–61', 61–61' and 62–62'. The one pair of pivotal centres 60–60' is provided by studs on the lever 52 and another pair 61–61' by similar studs on the lever 53. The third pair of pivot centres 62, 62' provide a mounting for a cutting tool head 65, to which are attached cutting tools 66, 67.

It will be seen, therefore, that on movement of the main support in the direction of the arrow Z, the whole units, including the parts 50, 51, 52, 53 and 65 will be advanced from Stage I position (not shown) to the position shown in FIGURE 7, in which the leading cutting edges of the tool bars 66, 67 will have partly stripped the burr from the link (corresponding to Stage II as described in connection wtih FIGURE 5), and in which the center of rotation of the cutting tool head 65 is coincident with the longitudinal axis of the link.

Figure 9:
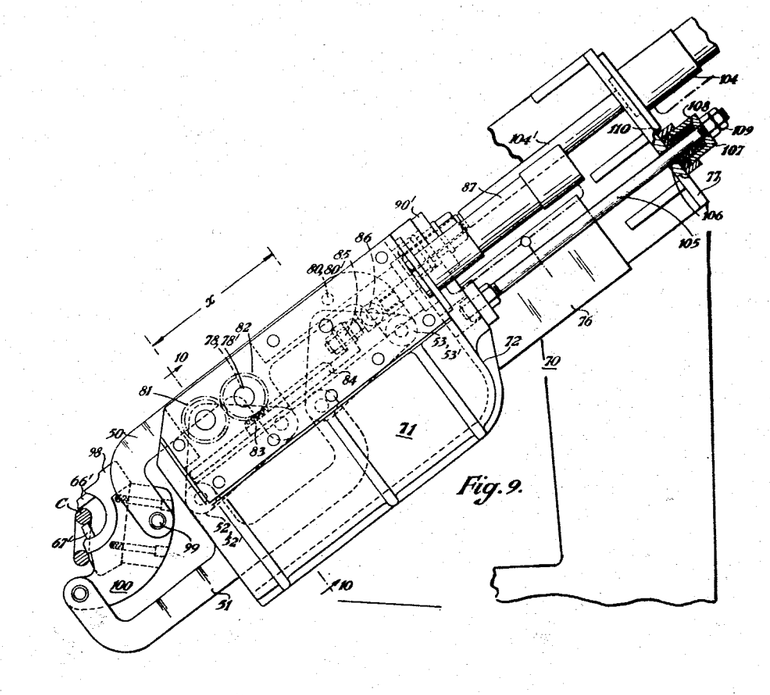
Figure 10:
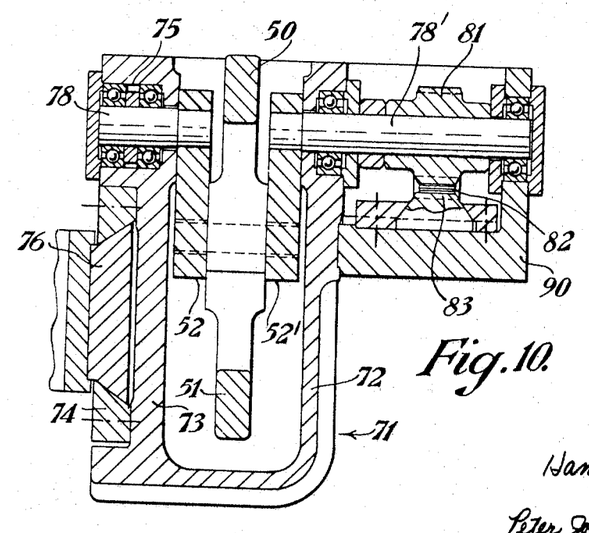
Figure 11:
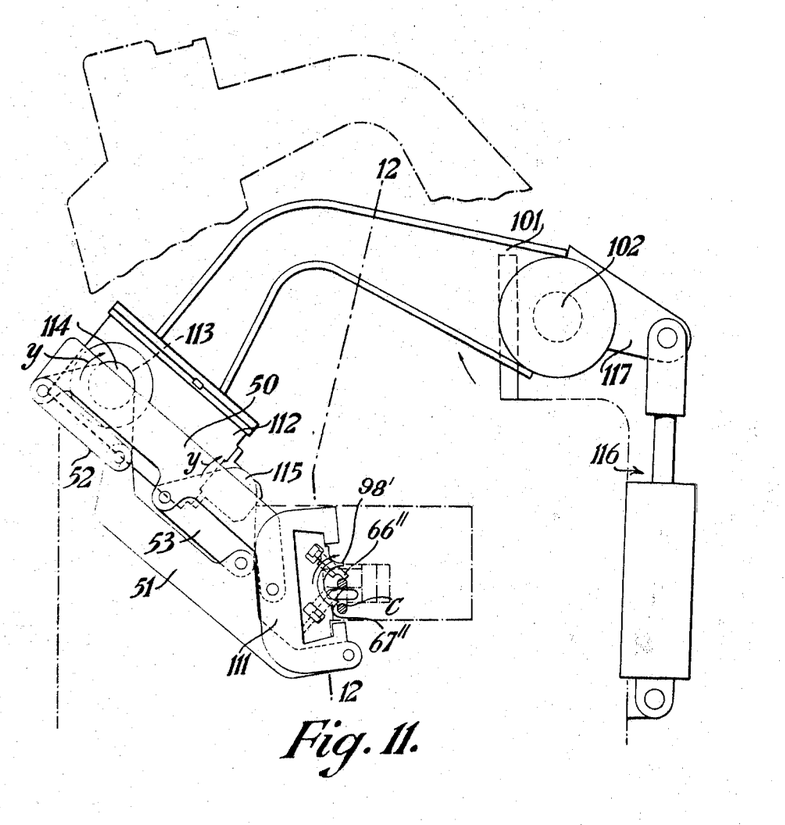
Figure 12:
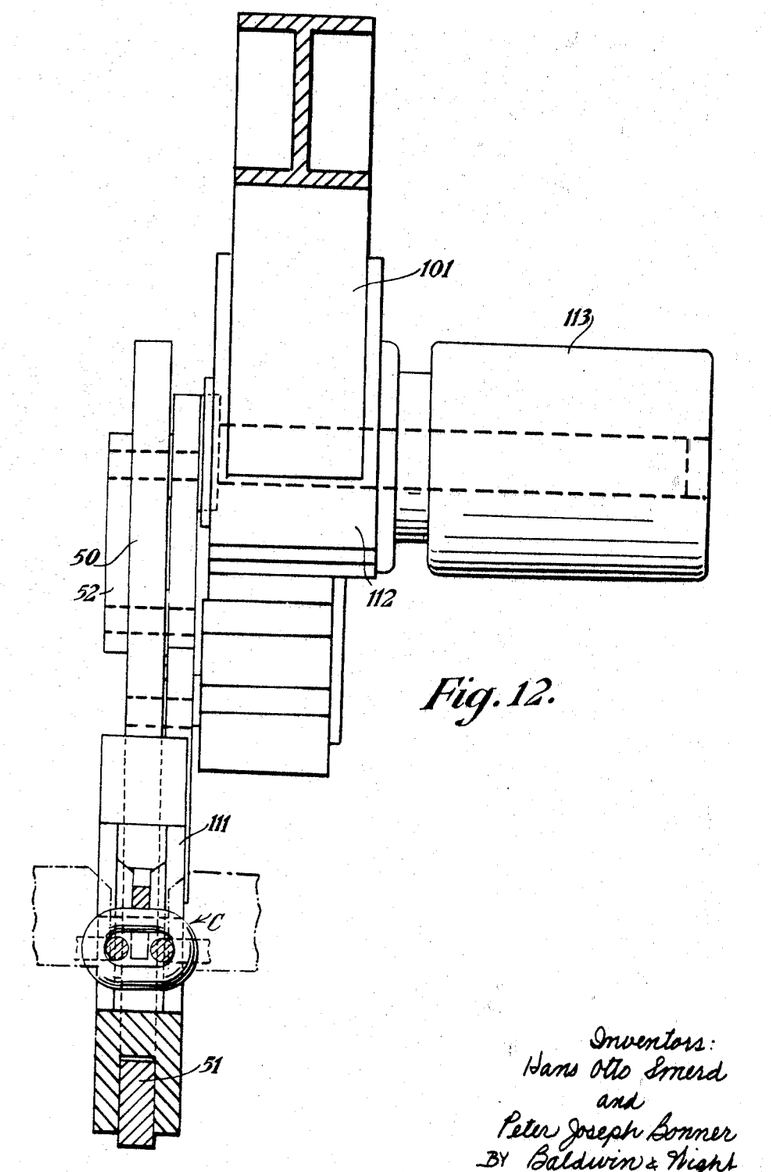

On completion of this movement, rotation of the spindle 54 through 350° will impart a to and fro movement to the larger gear 57, which is so designed as to produce an angular displacement slightly in excess of 180° of the trimming head 65 so as to remove the remaining half portions of the burrs from the link as shown in FIGURE 8 and corresponding to Stage III, the initial cut having been made either by a linear movement of the support carrying the plates 50, 51 as described below in connection with FIGURES 9–10 or an angular displacement of the support as described with reference to FIGURES 11–12.

Referring now to FIGURES 9 and 10, the support 70 comprises a forwardly extending limb 76 which serves as a guide for a carriage part 71 carrying the link plates 50–51, the trimming head and associated mechanism. The guide 76 forms part of a bracket 77 secured by means (not shown) to the machine frame. The carriage 71, which is a box-section and includes side walls 72, 73 is slidably mounted on the guide 76, the wall 73 having a recess fitted with jaws 74 for co-operation with the guide 76.

Journalled in bearings in the side walls 72, 73 of the carriage are two spindles 78, 80 the bearing in the side wall 73 for spindle 78 being indicated at 75. Secured to the opposite side wall 72 of the carriage is a bracket 90 in the form of an L, which bracket, together with the wall 72, is provided with bearings for spindles 78', 80', which spindles are complimentary to and paired with the spindles 78, 80: the bearings for the spindle 78', which are respectively carried in the wall 72 and the side wall of bracket 90 being indicated at 79. Corresponding bearing (not shown) for spindle 80', in alignment with the spindle 80, are likewise arranged in wall 72 and the bracket wall.

The forward spindle 78' has fast thereon a pinion 81 in constant mesh with a second pinion 82, which is driven by a rack 83.

Spindles 78, 78' at their inner or adjacent ends extend into the central box of the carriage 71; spindles 80, 80' similarly extend into the carriage and provide mounting for the lever members 52, 53 and thus associated links 50, 51, the spacing, indicated by the dotted lines X being arranged to coincide with the fulcrums of the levers 52, 53 which are respectively duplicated at 52', 53' and keyed thereto. It follows that angular movement of the forward spindle 78' will be transmitted to the lever 52.

Rack 83 is fast with a bar 84 having an offset arm 85, by which it is anchored through an anchor pin 86 to the piston rod of a hydraulic ram unit 87. The cylinder of the ram 87 is attached to a cross plate 90' secured across the ends of side walls 72, 73 of the carriage 71 and the outer wall of the L-shaped bracket 90.

It will be seen, therefore, that on the operative stroke of the ram 87, the rack 84 will, in turn, impart drive through the pinion 82 to the pinion 81 fast on the spindle 78'.

Since the two pairs of spindles 78–78', 80–80' are keyed to the lever members 52, 53, on actuation of the rack and pinion, drive will be imparted through the one lever 52 to the links 50, 51 mounting the trimming head.

A saddle 100 is pivotally connected through pins 99 to the inturned adjacent ends of the links 50, 51 so that on movement of the latter, the saddle, in which is carried a tool holder 98, will be moved through a given angle dependent upon the linear movement of the rack 84, this movement being such that the travel of the tool is through an angle slightly in excess of 180°.

Tool holder 98 is fitted with cutting tools 66', 67' corresponding to the tools 26, 27, for operation in a manner similar to the arrangement described in connection with FIGURES 1 and 2.

In order to advance the carriage 72 to the cutting position (Stage II) shown in FIGURE 9, where the lowermost tool bar 67' has cut through the underside of the link, there is provided a second ram 104, the cylinder of which is secured to the bracket 77 and ram piston 104' to the carriage 72.

Movement of the carriage under the action of the ram 104 is limited by means of a rod 105 fast to one end of the carriage and extending at its other end through an opening 106 in the bracket 77.

Adjustably mounted to the rod 105 is a cup 107 in which is housed a bush 108 of resilient material, the bush which projects beyond the end of the cup, having a circumferential lip of a size such that the whole is a sliding fit within an annular pocket 110 on the bracket. Clearly the bush 108 due to its resilience will function as a buffer and when the stop nuts 109 on rod 105 strike the outer face of the cup 107, further movement of the carriage is prevented.

In the arrangement shown in FIGURES 11 and 12, the links 50, 51 mounting the trimming head are carried by a swinging arm 101 pivoted on a fulcrum 102. Attached to the free end of the arm 101 is a bearing box 112 which carries a rotary actuator 113. The rotary actuator 113 drives through two shafts 114, 115, the spacing of whose centres corresponds to that of the levers 52, 53 through which the link plates 50, 51 of FIGURES 7 and 8 are operated. Accordingly, by keying the levers 52, 53 which in the embodiment of FIGURES 11–12 are duplicated, being indicated at 52", 53", motion is transmitted through the levers to a saddle 111 which carries a tool holder 98'.

A ram 116, the cylinder of which is fast on the machine frame, is connected to a lever 117 fast on the spindle 102 so that on operation of the ram, the swinging arm 101 will move from normal position shown in dash and dot line to the operative (Stage II) position shown in full lines in FIGURE 11.

Removal of the final portion of the burr (Stage III) is obtained on actuation of the links 50, 51 through the rotary actuator: the movement of the actuator is an oscillatory one through an angle of 185° as represented by the arrow $v$, which movement results in a corresponding angular displacement of the spindles 114, 115, this movement in turn being transmitted through the links 50, 51 to the tool holder.

What is claimed is:

1. A machine for removing weld flash from a welded member comprising means for supporting a welded member of the type having weld flash disposed at least partially about the exterior thereof, cutting means for removing the flash from the welded member, said cutting means including at least a single leading cutting edge and a single trailing cutting edge, first means for initially moving said cutting means toward the axis of the welded member whereby the leading cutting edge removes a portion of the flash from the welded member, second means for imparting only pure rotational movement to said cutting means about the axis of the welded member whereby the trailing cutting edge removes another portion of the weld flash from the welded member, stop means for arresting the initial movement of the cutting means at a position in which the axis of rotation of the cutting means and the axis of the welded member are in coincidence, means for guiding said cutting means during the rotational movement thereof, and said guiding means is defined in part by said stop means.

2. A machine for removing weld flash from a welded member comprising means for supporting a welded member of the type having weld flash disposed at least partially about the exterior thereof, cutting means for removing the flash from the welded member, said cutting means including at least a single leading cutting edge and a single trailing cutting edge, first means for initially moving said cutting means toward the axis of the welded member whereby the leading cutting edge removes a portion of the flash from the welded member, second means for imparting only pure rotational movement to said cutting means about the axis of the welded member whereby the trailing cutting edge removes another portion of the weld flash from the welded member, said machine further includes a carriage carrying said cutting means, means for mounting said carriage for linear sliding movement toward and away from the welded member, a fixed support arm, and said carriage being slidably mounted by its associated mounting means upon said fixed support arm.

3. The machine as defined in claim 2 wherein said rotation imparting means rotates said cutting means at least 180°.

4. A machine for removing weld flash from a welded member comprising means for supporting a welded member having weld flash disposed at least partially about the exterior thereof, cutting means for removing the flash from the welded member, said cutting means including at least a single leading cutting edge and a single trailing cutting edge, first means for initially moving said cutting means toward the axis of the welded member whereby the leading cutting edge removes a portion of the flash from the welded member, second means for imparting only pure rotational movement to said cutting means about the axis of the welded member whereby the trailing cutting edge removes another portion of the flash from the welded member, adjusting means for adjustably positioning the cutting means to bring the axis of rotation thereof into coincidence with the axis of the welded member irrespective of the position thereof as determined by the supporting means, a support arm, said cutting means being carried by said support arm, and said adjusting means including means for adjustably moving said support arm in two different angularly related planes.

5. The machine as defined in claim 4 wherein said adjusting means includes means mounting said support arm for linear sliding movement in a horizontal plane.

6. The machine as defined in claim 4 wherein said adjusting means includes first and second bracket means mounted for relative movement in directions generally normal to each other, said second bracket means being carried by said first bracket means, and means pivotally mounting said support arm on said second bracket means.

7. The machine as defined in claim 6 wherein said adjusting means further includes eccentric means between the first and second bracket means for effecting relative adjustment thereof upon rotation of said eccentric means.

8. A machine for removing weld flash from a welded member comprising means for supporting a welded member having weld flash disposed at least partially about the exterior thereof, cutting means for removing the flash from the welded member, said cutting means including at least a single leading cutting edge and a single trailing cutting edge, first means for initially moving said cutting means toward the axis of the welded member whereby the leading cutting edge removes a portion of the flash from the welded member, second means for imparting only pure rotational movement to said cutting means about the axis of the welded member whereby the trailing cutting edge removes another portion of the flash from the welded member, said cutting means being carried by a holder, means journalling said holder for rotation relative to a support arm, said rotation imparting means including rack means for rotating said holder and the cutting means carried thereby, said holder including a peripheral toothed portion, an interchangeable pinion in meshed relationship with said peripheral toothed portion, and said pinion also being additionally in meshed relationship with said rack means whereupon movement of the latter imparts rotation to said holder through said pinion.

9. A machine for removing weld flash from a welded member comprising means for supporting a welded member having weld flash disposed at least partially about the exterior thereof, cutting means for removing the flash from the welded member, said cutting means including at least a single leading cutting edge and a single trailing cutting edge, first means for initially moving said cutting means toward the axis of the welded member whereby the leading cutting edge removes a portion of the flash from the welded member, second means for imparting only pure rotational movement to said cutting means about the axis of the welded member whereby the trailing cutting edge removes another portion of the flash from the welded member, said rotation imparting means including a pair of links, means coupling said links to each other for relative angular displacement, pivot means coupling said cutting means to said links, means for imparting movement to one of said links whereby said cutting means is rotated upon the displacement of said links relative to each other, and at least one of said pivot means defining an arcuate path during the movement thereof whose locus coincides with the axis of the welded member.

10. The machine as defined in claim 9 including a support arm, means mounting a carriage for sliding movement relative to said support arm, and said rotation imparting means being carried by said carriage.

11. The machine as defined in claim 10 wherein said carriage includes a housing defined in part by a pair of side walls, said rotation imparting means being housed between said side walls, and at least one of said lever members being connected to a spindle journalled in said side walls.

12. The machine as defined in claim 11 wherein said rotation imparting means further includes rack and pinion means carried by said carriage for imparting rotation to said at least one lever member through said spindle.

13. The machine as defined in claim 12 wherein piston-cylinder means are provided for imparting sliding movement to said carriage, and piston-cylinder means are provided for imparting reciprocal movement to said rack means.

14. A machine for removing weld flash from a welded member comprising means for supporting a welded member having weld flash disposed at least partially about the exterior thereof, cutting means for removing the flash from the welded member, said cutting means including at least a single leading cutting edge and a single trailing cutting edge, first means for initially moving said cutting means toward the axis of the welded member whereby the leading cutting edge removes a portion of the flash from the welded member, second means for imparting pure rotational movement to said cutting means about the axis of the welded member whereby the trailing cutting edge removes another portion of the flash from the welded member, a support arm, means mounting said support arm for pivotal movement between a first position at which said cutting means is spaced from the supporting means and a second position at which said cutting means is more closely adjacent said supporting means, said first moving means includes piston-cylinder means for imparting pivotal movement to said support arm, stop means for arresting the initial movement of the cutting means at a position in which the axis of rotation of the cutting means and the axis of the welded member are in coincidence, adjusting means for adjustably positioning the support arm to selectively position the axis of rotation of the cutting means in coincidence with the axis of the welded member irrespective of the position at which the welded member is supported by the supporting means and the size or shape thereof.

15. The machine as defined in claim 14 including a holder for said cutting means, means journalling said holder for rotation relative to said supporting arm, said rotation imparting means including drive means for rotating said holder, and said drive means including interchangeable components for selectively varying the rotation of said holder and the cutting means carried thereby.

References Cited

UNITED STATES PATENTS

| | | | |
|---|---|---|---|
| 2,824,420 | 2/1958 | Esser | 59—29 |
| 3,070,952 | 1/1963 | Wehlin | 59—29 |

FOREIGN PATENTS

| | | |
|---|---|---|
| 86,198 | 9/1957 | Netherlands. |
| 738,998 | 10/1955 | Great Britain. |

CHARLES W. LANHAM, *Primary Examiner.*

G. P. CROSBY, *Assistant Examiner.*

U.S. Cl. X.R.

83—914